No. 847,509. PATENTED MAR. 19, 1907.
J. RILING & C. W. SAGEE.
CONVEYING APPARATUS.
APPLICATION FILED JULY 7, 1906.

WITNESSES:

INVENTORS
BY
ATTORNEYS.

UNITED STATES PATENT OFFICE.

JOSEPH RILING AND CHARLES W. SAGEE, OF PHILADELPHIA, PENNSYLVANIA, ASSIGNORS TO HERO FRUIT JAR COMPANY, OF PHILADELPHIA, PENNSYLVANIA, A CORPORATION OF PENNSYLVANIA.

CONVEYING APPARATUS.

No. 847,509. Specification of Letters Patent. Patented March 19, 1907.

Application filed July 7, 1906. Serial No. 325,053.

*To all whom it may concern:*

Be it known that we, JOSEPH RILING and CHARLES W. SAGEE, citizens of the United States, residing at Philadelphia, county of Philadelphia, and State of Pennsylvania, have invented a new and useful Improvement in Conveying Apparatus, of which the following is a full, clear, and exact description, reference being had to the accompanying drawings, which form a part of this specification.

Our invention is particularly designed to carry glass tops for jars from the molding or pressing machine to the leer, where they are annealed. These jars leave the molding or pressing machine on the flat. On the other hand, on account of liability to breakage, they cannot be carried through the leer on the flat, but must be carried on edge. We have therefore invented an apparatus in which the articles in the case mentioned—jartops—are received from the pressing-table on the flat on a conveyer by which they are carried to and delivered into a chute leading to the leer. This chute is provided with a bottom which at the upper end of the chute lies flat, while at the lower end of the chute it lies on edge, this bottom being bent gradually from the flat at the upper end of the chute to on edge at the lower end of the chute. Thus the articles in passing down this chute are turned from on the flat to on edge and are delivered in the latter condition onto the receptacle in the leer.

The conveyer is formed of a sprocket-chain to which are secured blocks, the faces of which are covered with asbestos.

We will now describe the embodiment of our invention shown in the accompanying drawings.

Figure 1:
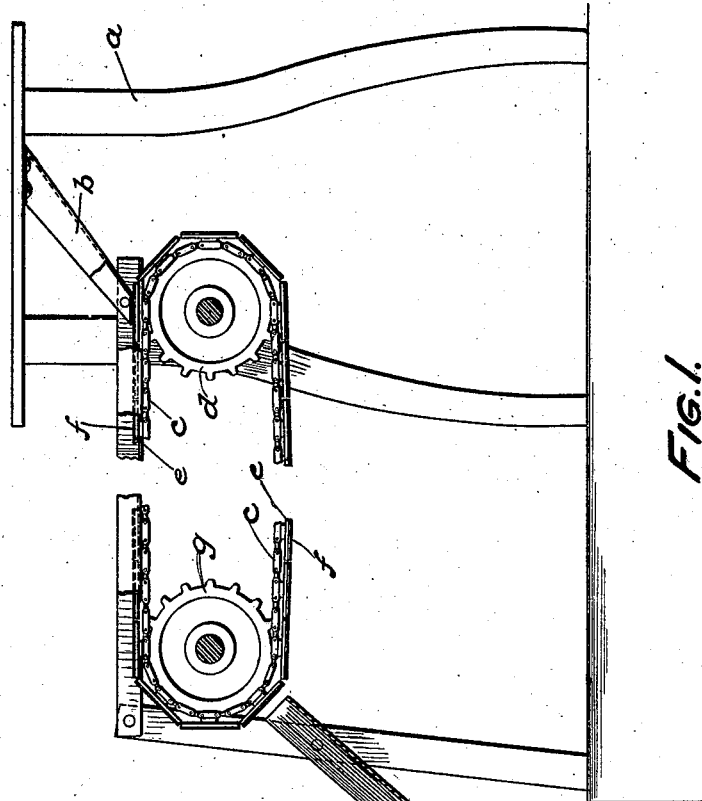
Figure 2:
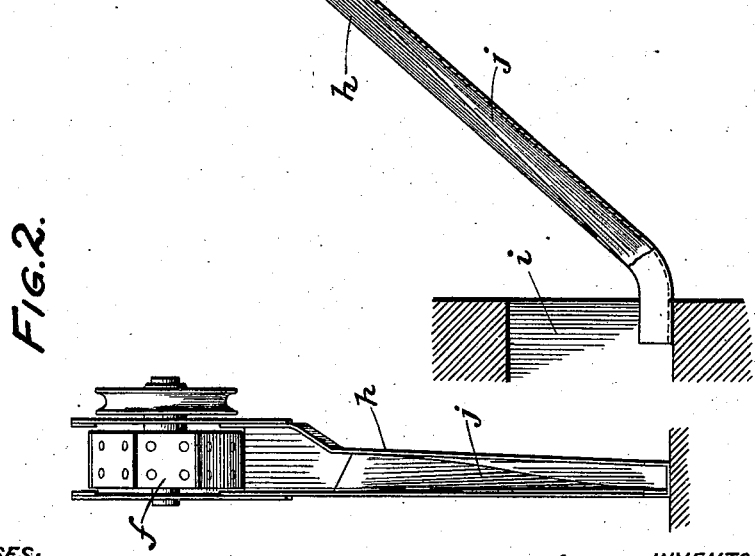

In the drawings, Figure 1 is a side elevation partially broken away. Fig. 2 is an end view of the conveyer and our improved chute.

*a* is the frame of a glass-pressing machine of a well-known construction; *b*, the delivery-chute therefrom; *c*, an endless conveyer-chain passing over the sprocket-wheels *d* and *g*, driven by any well-known means. (Not shown.) Secured to the face of this chain are the blocks *e*, the faces of which are covered with asbestos *f*. *h* is a chute leading to the leer *i*. The upper end of this chute is in position to receive the articles as they drop off the blocks when the blocks pass around the wheel *g*. In this chute is the bottom *j*. The upper end of this bottom lies flat in the chute; but from the upper to the lower end of the chute this bottom *j* is gradually bent upward, so that at the lower end of the chute it stands on edge.

The articles from the pressing-machine are delivered into the chute *b* on the flat and from thence are delivered on the flat onto the asbestos face *f* of the blocks *e*. In the passage of the conveyer around the wheel *g* the articles are delivered on the flat into the chute *h* and on the upper end of the bottom *j* of the chute *h*. In the passage downward through the chute the bending of the bottom causes the articles to be turned ninety degrees or from the flat to edge.

Having now fully described our invention, what we claim, and desire to protect by Letters Patent, is—

1. In an apparatus for carrying glass tops from the press to the leer, in combination, a chute from a pressing-machine, a conveyer adapted to convey the tops having its flat surface in line with said chute and adapted to receive the tops delivered by the press-chute on the flat, wheels about which said conveyer turns, a chute in line with the conveyer at said point, a leer at a lower level than said conveyer to the mouth of which said chute extends, the bottom of said chute at the upper portion being on the flat, and on edge at the lower end.

2. In an apparatus for carrying glass tops from the press to the leer, in combination, a chute from a pressing-machine, a conveyer adapted to convey the tops having its flat surface in line with said chute and adapted to receive the tops delivered by the press-chute on the flat, wheels about which said conveyer turns, a chute in line with the conveyer at said point, a leer at a lower level than said conveyer to the mouth of which said chute extends, the bottom of said chute at the upper portion being on the flat and inclining gradually to on edge at the lower end.

In testimony of which invention we have hereunto set our hands, at Philadelphia, Pennsylvania, on this 29th day of June, 1906.

JOSEPH RILING.
CHARLES W. SAGEE.

Witnesses:
CLAYTON D. GRISCOM,
HUTTON KENNEDY.